United States Patent
Kitai

(10) Patent No.: US 11,019,267 B2
(45) Date of Patent: May 25, 2021

(54) DISPLAY CONTROL APPARATUS AND CONTROL METHOD THEREFOR

(71) Applicant: CANON KABUSHIKI KAISHA, Tokyo (JP)

(72) Inventor: Shimpei Kitai, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/353,809

(22) Filed: Mar. 14, 2019

(65) Prior Publication Data

US 2019/0289221 A1 Sep. 19, 2019

(30) Foreign Application Priority Data

Mar. 19, 2018 (JP) .................................. 2018-050914

(51) Int. Cl.
*H04N 5/232* (2006.01)
*G03B 13/00* (2006.01)

(52) U.S. Cl.
CPC ... *H04N 5/232945* (2018.08); *H04N 5/23216* (2013.01)

(58) Field of Classification Search
CPC .......... H04N 5/23245; H04N 5/23216; H04N 5/232127; H04N 5/23212; H04N 5/23293; H04N 5/232933; H04N 5/23295; H04N 5/232945
See application file for complete search history.

(56) References Cited

U.S. PATENT DOCUMENTS

| | | | |
|---|---|---|---|
| 2016/0295120 A1* | 10/2016 | Ota | H04N 5/23219 |
| 2018/0217357 A1* | 8/2018 | Takahashi | G03B 13/36 |
| 2018/0348470 A1* | 12/2018 | Suzuki | H04N 5/23229 |
| 2019/0041726 A1* | 2/2019 | Nishimura | G06F 3/0412 |
| 2019/0182432 A1* | 6/2019 | Ise | H04N 5/232122 |

FOREIGN PATENT DOCUMENTS

| | | |
|---|---|---|
| JP | 2016-095476 A | 5/2016 |
| JP | 2016-197180 A | 11/2016 |

\* cited by examiner

*Primary Examiner* — Kelly L Jerabek
(74) *Attorney, Agent, or Firm* — Canon U.S.A., Inc. IP Division

(57) ABSTRACT

An apparatus includes a moving unit configured to move a focus detection position based on a user operation, within a predetermined range of an image, a display control unit configured to perform display control for displaying an enlarged portion of the image, and a control unit configured to perform control for displaying a display item that indicates the focus detection position and an indicator that indicates the predetermined range, together with the enlarged portion of the image, in a specific state including a state where the enlarged portion of the image is displayed.

19 Claims, 6 Drawing Sheets

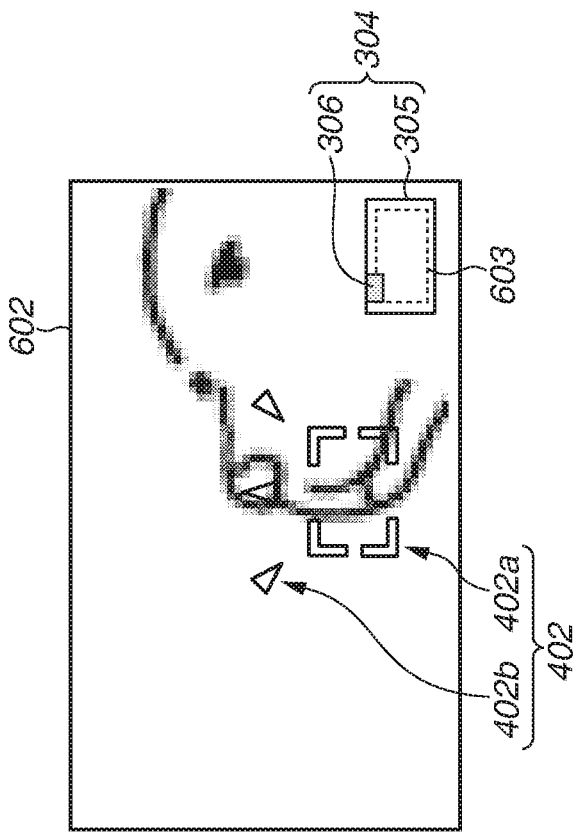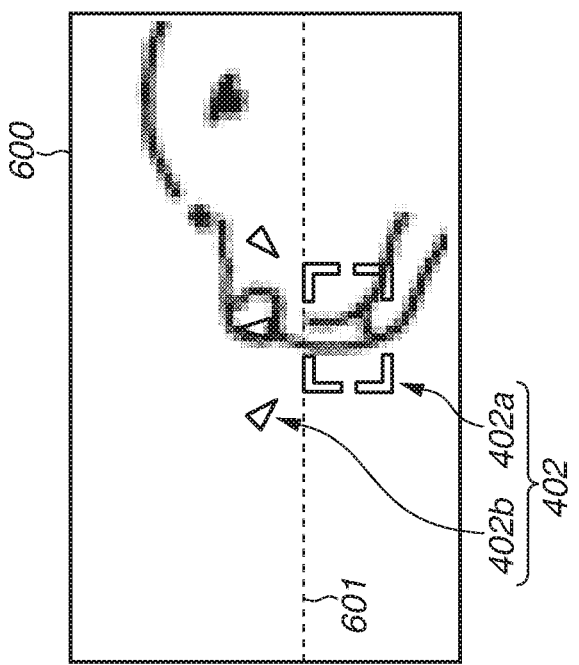

DISPLAY CONTROL APPARATUS AND CONTROL METHOD THEREFOR

BACKGROUND OF THE INVENTION

Field of the Invention

The aspect of the embodiments relates to a display control apparatus and a control method for the display control apparatus.

Description of the Related Art

In recent years, a function that offers good focus adjustment in autofocus (AF) and manual focus (MF) in an image pickup apparatus has been discussed.

Japanese Patent Application Laid-Open No. 2016-095476 discusses an image pickup apparatus that displays an area in which image pickup plane phase difference AF can be performed in a superimposing manner on a picked-up image during live-view image capturing.

Japanese Patent Application Laid-Open No. 2016-197180 discusses an image pickup apparatus that has a function of assisting focus adjustment in MF. This function enables a user to move a display item to an arbitrary position, and cause the degree of in-focus based on a defocus amount at this position to be displayed by changing the display mode of the display item.

In the image pickup apparatus of Japanese Patent Application Laid-Open No. 2016-197180, however, there is a position at which a defocus amount cannot be calculated for a reason such as the absence of a phase difference detection pixel among pixels of an image pickup unit corresponding to a peripheral portion of a picked-up image. In a case where setting is made to disable the movement of the display item to such a position, there is such an issue that the user cannot understand why the display item cannot be moved, in particular, in a state where an enlarged portion of the image is displayed.

SUMMARY OF THE INVENTION

According to an aspect of the embodiments, an apparatus includes a memory and at least one processor configured to perform the operations of the following units, a moving unit configured to move a focus detection position based on a user operation, within a predetermined range of an image, a display control unit configured to perform display control for displaying an enlarged portion of the image, and a control unit configured to perform control for displaying a display item that indicates the focus detection position and an indicator that indicates the predetermined range, together with the enlarged portion of the image, in a specific state including a state where the enlarged portion of the image is displayed.

Further features of the disclosure will become apparent from the following description of exemplary embodiments with reference to the attached drawings.

BRIEF DESCRIPTION OF THE DRAWINGS

FIGS. 6A and 6B are diagrams illustrating an example of display that indicates a focus guide movable range.

DESCRIPTION OF THE EMBODIMENTS

An exemplary embodiment of the disclosure will be described in detail below with reference to the accompanying drawings.

It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment.

In the present exemplary embodiment, a case where a display control apparatus is a digital camera 100 (hereinafter referred to as "camera 100") will be described.

<Hardware Configuration>

Figure 1:
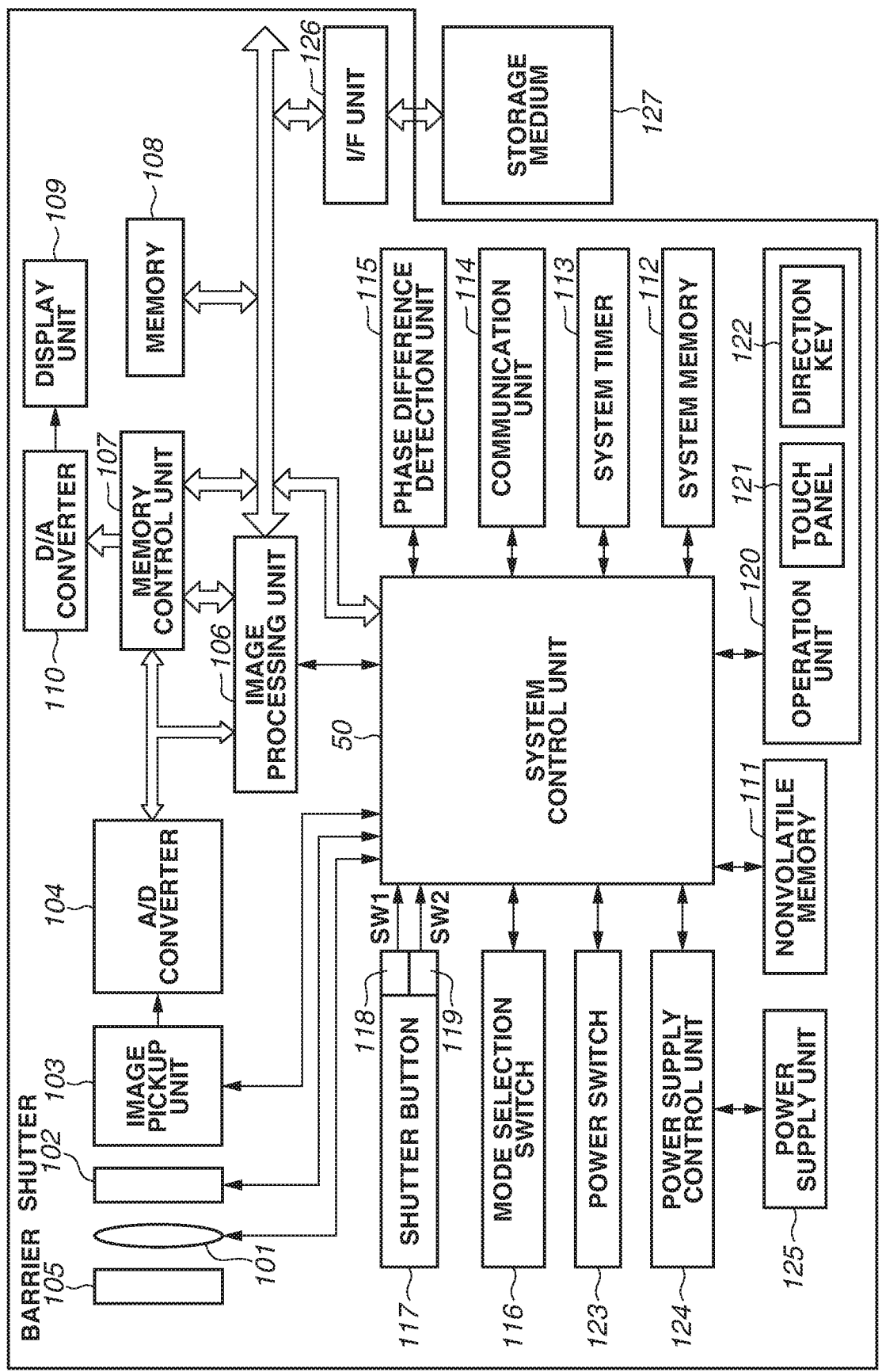
FIG. 1 is a block diagram illustrating an example of a configuration of a digital camera.

FIG. 1 is a block diagram illustrating an example of a configuration of the camera 100.

An image capturing lens 101 is a lens group including a zoom lens and a focus lens.

A shutter 102 has an aperture function.

An image pickup unit 103 is an image pickup element configured of a component such a complementary metal oxide semiconductor (CMOS) element that converts an object image into an electrical signal. The image pickup unit 103 is an example of an image pickup device. The image pickup unit 103 has pixels including a pixel that can detect a defocus amount, i.e., a phase difference detection pixel, so that image pickup plane phase difference autofocus (AF) can be performed. Specifically, the image pickup unit 103 has a plurality of image capturing pixels and a plurality of phase difference detection pixels. The image capturing pixels generate an object image, by each receiving a light beam passing through the entire area of the exit pupil of an image capturing optical system. The phase difference detection pixels receive respective light beams passing through different areas of the exit pupil of the image capturing optical system. The plurality of phase difference detection pixels as a whole can receive a light beam passing through the entire area of the exit pupil of the image capturing optical system.

An analog-to-digital (A/D) converter 104 converts an analog signal output from the image pickup unit 103 into a digital signal.

A barrier 105 protects an image pickup system from dirt and damage by covering the image pickup system including the image capturing lens 101, the shutter 102, and the image pickup unit 103.

An image processing unit 106 performs predetermined resizing processing such as pixel interpolation or reduction, and color conversion processing, for image data from the A/D converter 104 or image data from a memory control unit 107. The image processing unit 106 performs predetermined processing for calculation using picked-up image data, and performs automatic white balance (AWB) processing in through-the-lens (TTL) format, based on a result of the calculation. Further, the image processing unit 106 performs predetermined processing for calculation using picked-up image data, and a system control unit 50 performs exposure control and ranging control, based on a result of the calculation. Specifically, the system control unit 50 performs AF processing such as the image pickup plane phase difference AF or contrast AF, automatic exposure (AE) processing, and electronic flash (EF) processing (pre-flash processing), based on a result of the calculation. A phase difference detection unit 115 detects a focus based on an instruction from the system control unit 50, so that the image pickup plane phase difference AF is performed.

The image data from the A/D converter 104 is written into a memory 108 via the image processing unit 106 and the memory control unit 107, or directly via the memory control unit 107.

The memory 108 stores image data that is obtained by the image pickup unit 103 and then converted into digital data by the A/D converter 104. The memory 108 also stores display image data to be displayed on a display unit 109. The memory 108 has a sufficient storage capacity to store a predetermined number of still images as well as a moving image and sound for a predetermined time. The memory 108 also serves as a memory for image display (a video memory).

A digital-to-analog (D/A) converter 110 converts the display image data stored in the memory 108 into an analog signal, and supplies the analog signal to the display unit 109. Therefore, the display image data written in the memory 108 is displayed by the display unit 109 via the D/A converter 110.

The display unit 109 performs display on a display device such as a liquid crystal display (LCD) based on the analog signal from the D/A converter 110. Digital signals that have gone through the A/D conversion once by the A/D converter 104 and that are accumulated in the memory 108 are converted into analog signals by the D/A converter 110, and these analog signals are transmitted to the display unit 109 sequentially, so that a live view image can be displayed.

A nonvolatile memory 111 is a memory provided as an electrically erasable recordable storage medium. For example, an electrically erasable programmable read only memory (EEPROM) can be used for the nonvolatile memory 111. The nonvolatile memory 111 stores, for example, a constant, a program, and a threshold for operation of the system control unit 50. The program stored in the nonvolatile memory 111 is a program to be executed by the system control unit 50. Further, the nonvolatile memory 111 stores setting of a menu for the operation of the system control unit 50, and the setting of the menu can be updated by a user operation.

The system control unit 50 controls the entire camera 100. The system control unit 50 implements processing of a flowchart to be described below, by executing the program stored in the nonvolatile memory 111. For example, the system control unit 50 displays a focus guide movable range indicating a range in which a focus guide is movable. The system control unit 50 corresponds to an example of a control unit.

For example, a random access memory (RAM) can be used for a system memory 112. For example, a constant, a variable, and the program read out from the nonvolatile memory 111 for the operation of the system control unit 50 are loaded into the system memory 112. Further, the system control unit 50 performs display control by controlling components such as the memory 108, the D/A converter 110, and the display unit 109. The system control unit 50 corresponds to an example of a display control unit.

A system timer 113 is a clocking unit that measures the time to be used for various kinds of control and the time of a built-in clock. For example, the system control unit 50 determines whether a predetermined time has elapsed, using the system timer 113.

A communication unit 114 is connected wirelessly or by a wired cable to transmit and receive video signals and sound signals. The communication unit 114 can also be connected to a wireless local area network (LAN) and the Internet. The communication unit 114 can transmit images (including a live view image) picked up by the image pickup unit 103, and images recorded in a storage medium 127. Further, the communication unit 114 can receive image data and other various kinds of information from an external apparatus.

The phase difference detection unit 115 performs phase difference detection based on output signals of a plurality of phase difference detection pixels that is disposed in the entire surface within a portion of the image pickup unit 103 or discretely disposed in a portion of the image pickup unit 103.

A mode selection switch 116, a shutter button 117 (a first shutter switch 118 and a second shutter switch 119), and an operation unit 120 are operation members for inputting various operation instructions to the system control unit 50.

The mode selection switch 116 can switch the operating mode of the system control unit 50 to any of modes including a still image capturing mode, a moving image capturing mode, and a playback mode. The still image capturing mode includes modes such as an automatic image capturing mode, an automatic scene determination mode, a manual mode, various scene modes each provided for image capturing setting for the corresponding image capturing scene, a program AE mode, and a custom mode. For example, switching to any one of these modes included in the still image capturing mode can be performed directly via the mode selection switch 116. Alternatively, upon switching to the still image capturing mode once using the mode selection switch 116, switching to any one of the modes included in the still image capturing mode may be performed using other operation member. The moving image capturing mode may similarly include a plurality of modes.

The shutter button 117 is a button for providing an image capturing preparation instruction or an image capturing instruction from a user to the system control unit 50. The first shutter switch 118 is turned on by a half press (the image capturing preparation instruction) while the shutter button 117 is operated, so that a first shutter switch signal SW1 is generated. The system control unit 50 starts the operation such as the AF processing, the AE processing, the AWB processing, and the EF processing, based on the first shutter switch signal SW1. The second shutter switch 119 is turned on by the completion of the operation of the shutter button 117, i.e., a full press (the image capturing instruction), so that a second shutter switch signal SW2 is generated. The system control unit 50 starts the operation of a series of steps of image capturing processing, from reading out a signal from the image pickup unit 103 to writing image data into the storage medium 127, based on the second shutter switch signal SW2.

The operation members of the operation unit 120 are assigned functions for each scene as appropriate by, for example, selecting various function icons displayed on the display unit 109 and operating the selected icons, so that the operation members of the operation unit 120 act as various function buttons. Examples of the function buttons include a menu button, a return button, a function call button, a setting switching button, a narrowing-down button, and an attribute change button. For example, when the menu button is pressed, a menu screen for enabling various kinds of setting is displayed on the display unit 109. The user can intuitively perform various kinds of setting, using the menu screen displayed on the display unit 109, as well as up, down, right, and left buttons, and a SET button. The operation unit 120 further includes an enlargement key to be described below.

A touch panel 121 is an operation member included in the operation unit 120. Input coordinates in the touch panel 121 and display coordinates in the display unit 109 are associated with each other, so that it is possible to configure a graphical user interface (GUI) that makes the user feel as if the user can directly operate a screen displayed on the display unit 109. The system control unit 50 receives information indicating input coordinates from the touch panel 121, and moves an object such as a cursor upward, downward, leftward, and rightward based on the received information.

A direction key 122 is an operation member included in the operation unit 120. The system control unit 50 moves an enlargement range of an image displayed on the display unit 109 or moves the focus guide, by receiving an input signal from the direction key 122.

A power switch 123 is a push button for switching between power-on and power-off. The power switch 123 may be a lever for switching between power-on and power-off depending on the position.

A power supply control unit 124 includes a battery detecting circuit, a direct current to direct current (DC-DC) converter, and a switch circuit for switching one block to another to be energized, so that the power supply control unit 124 detects attachment of a battery, a battery type, and a remaining battery level. Based on a result of such detection and an instruction of the system control unit 50, the power supply control unit 124 controls the DC-DC converter, and supplies a voltage for a period, to each of components including the storage medium 127.

A power supply unit 125 is a primary battery such as an alkaline cell or lithium battery, a secondary battery such as a NiCd battery, NiMH battery, or Li battery, or an AC adapter.

A storage medium interface (I/F) unit 126 is an interface with the storage medium 127.

The storage medium 127 executes recording of image data and readout of recorded image data, based on control by the storage medium I/F unit 126. The storage medium 127 is a medium such as a detachable memory card configured of a semiconductor memory or magnetic disk. The storage medium 127 may be built in the camera 100.

The camera 100 of the present exemplary embodiment has a focus guide function and an image enlargement display function, as focus assist functions.

The focus guide function is a mode in which a pointer indicates a focus status of an area designated by the user. The user can confirm whether the focus status is an in-focus state (a state where an object at a focus detection position is in focus), a front-focus state, or a back-focus state, by visually recognizing the pointer. The image enlargement display function is a function of displaying a picked-up image (a live view image) of an area designated by the user at an arbitrary magnification. The user can confirm more details of the picked-up image, by visually recognizing an enlarged image.

<Display Example in Execution of Focus Guide Function>

First, a display example at a time when the focus guide function is enabled and executed will be described with reference to FIGS. 2A to 2D.

Figure 2A:
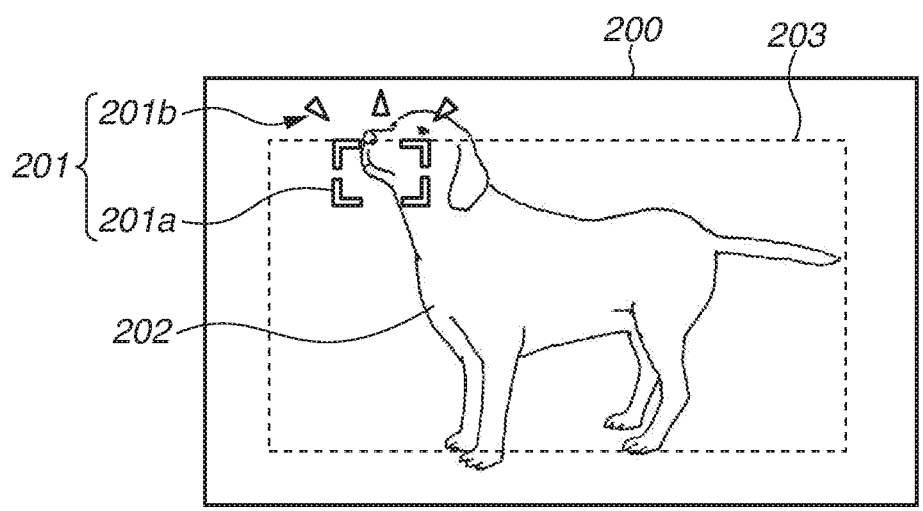
FIGS. 2A to 2D are diagrams illustrating a focus guide function.

FIG. 2A is a diagram illustrating an example of a display screen 200 displayed on the display unit 109. The display screen 200 illustrated in FIG. 2A displays an entire picked-up image.

The display screen 200 displays a focus guide 201 superimposed on an object 202 serving as the picked-up image.

The focus guide 201 is on screen display (OSD) data, and is an example of a display item. The focus guide 201 includes a guide frame 201a and a pointer 201b. The guide frame 201a is a display item that indicates a focus detection position. The display mode of the guide frame 201a changes based on the degree of in-focus that serves as the focus status at the focus detection position. The pointer 201b is a display item that indicates the degree of in-focus. The display mode of the pointer 201b changes based on the degree of in-focus at the focus detection position.

Here, the change of the display mode of the focus guide 201 will be described with reference to FIGS. 2B to 2D.

Figure 2B:
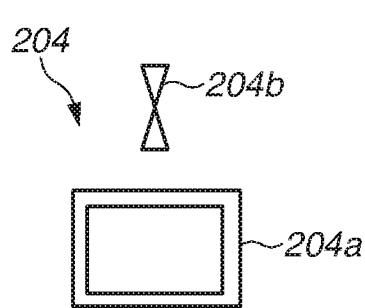

A focus guide 204 illustrated in FIG. 2B indicates the in-focus state (the state where the object at the focus detection position is in focus). A guide frame 204a has a seamless circular frame shape, and the frame in itself has, for example, green color (a first color). The shape and the color of the guide frame 204a indicate being in the in-focus state.

A pointer 204b is located above the guide frame 204a and indicated by two triangles having a horizontal line of symmetry, and the apex angles of the respective triangles are connected to each other. The pointer 204b has the same color as the color of the guide frame 204a. The shape and the color of the pointer 204b indicate being in the in-focus state.

Figure 2C:
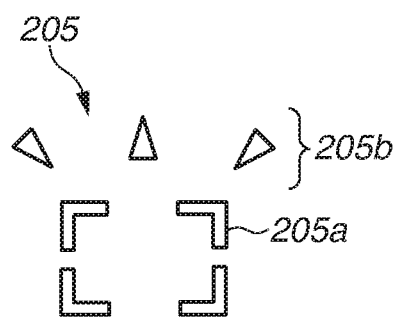

A focus guide 205 illustrated in FIG. 2C indicates the back-focus state (a state where focus is located behind the object at the focus detection position). A guide frame 205a has a circular frame shape having breaks in part, and the frame in itself has, for example, white color (a second color). The shape and the color of the guide frame 205a indicate not being in the in-focus state.

A pointer 205b is indicated by three triangles that are located above the guide frame 205a. The central triangle indicates a target point of the right and left triangles to achieve the in-focus state, and has the apex angle facing upward. The right and left triangles indicate the degree of in-focus based on a distance (or an angle) between the right and left triangles, and each have the apex angle facing downward. The distance (or angle) between the right and left triangles is smaller (less, or smaller in the angle) in a case where the amount of a shift from the in-focus state is small, than in a case where the amount of a shift from the in-focus state is large. The degree of in-focus changes if the distance between the object and the camera 100 varies. Therefore, the distance between the right and left triangles dynamically changes to decrease or increase. Further, the pointer 205b has the same color as the color of the guide frame 205a. The shape of the pointer 205b indicates being in the back-focus state, and the color of the pointer 205b indicates not being in the in-focus state.

Figure 2D:
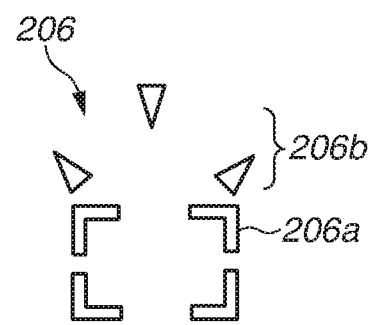

A focus guide 206 illustrated in FIG. 2D indicates the front-focus state (a state where focus is located in front of the object at the focus detection position). A guide frame 206a has a circular frame shape having breaks in part, and the frame in itself has, for example, white color (the second color). The shape and the color of the guide frame 206a indicate not being in the in-focus state.

A pointer 206b is indicated by three triangles that are located above the guide frame 206a. The central triangle indicates a target point of the right and left triangles to achieve the in-focus state, and has the apex angle facing downward. The right and left triangles indicate the degree of in-focus based on a distance (or an angle) between the right and left triangles, i.e., indicate the amount of a shift from the in-focus state at the focus detection position, and each have the apex angle facing upward. As in FIG. 2C, the distance (or angle) between the right and left triangles is smaller (less, or smaller in the angle) in a case where the amount of a shift from the in-focus state is small, than in a case where the amount of a shift from the in-focus state is large. Further, the pointer 206b has the same color as the color of the guide frame 206a. The shape of the pointer 206b indicates being in the front-focus state, and the color of the pointer 206b indicates not being in the in-focus state.

The user performs an operation for bringing the focus guide 201 (the guide frame 201a) to a position at which the user desires to confirm the focus status in order to perform a focus adjustment by himself or herself. The user can change the focus guide 201 (the guide frame 201a) to a desired position, by operating the touch panel 121 or the direction key 122 included in the operation unit 120.

Specifically, the system control unit 50 receives an input signal from the operation unit 120 and determines a position of the focus guide 201 based on the content of the input signal. Next, the system control unit 50 outputs the determined position of the focus guide 201 to the phase difference detection unit 115, and the phase difference detection unit 115 calculates a defocus amount at the position of the focus guide 201. Further, based on the defocus amount, the phase difference detection unit 115 calculates information indicating any of the in-focus state, the front-focus state, or the back-focus state, and in-focus degree information, as the focus status. The phase difference detection unit 115 outputs the calculated information to the system control unit 50. The system control unit 50 displays the focus guide 201 at the determined position, in the display mode of any one of the focus guide 204 in FIG. 2B to the focus guide 206 in FIG. 2D described above, based on the output focus status. Therefore, the user can grasp the focus status at the desired position, by visually recognizing the focus guide 201. Further, the user can easily perform a focus adjustment, because the display mode of the focus guide 201 dynamically changes while the user performs the focus adjustment based on the focus status.

Referring back to FIG. 2A, a focus guide movable range 203 is illustrated in the display screen 200. The focus guide 201 can move only within the focus guide movable range 203 (a predetermined range) and cannot move beyond the boundary of the focus guide movable range 203. In a case where the display screen 200 displays the entire picked-up image (the state illustrated in FIG. 2A), the focus guide movable range 203 is not displayed in the display screen 200.

The system control unit 50 sets the focus guide movable range 203, based on information stored in the nonvolatile memory 111 beforehand. In a case where an operation for moving the focus guide 201 beyond the focus guide movable range 203 is performed by the user, the system control unit 50 performs control for moving the focus guide 201 only to a position located at the movable edge of the focus guide movable range 203.

Here, the focus guide movable range 203 is set, because the phase difference detection pixel is not disposed at a position of the image pickup unit 103 corresponding to the outside of the focus guide movable range 203, and therefore, the defocus amount cannot be calculated at such a position, and thus the degree of in-focus cannot be acquired. Another reason is that there is a case where, even when the phase difference detection pixels are disposed in the entire area of the image pickup unit 103, focus detection cannot be performed accurately for the outside of the focus guide movable range 203 depending on the optical performance of the image capturing lens 101.

<Display Example in Execution of Image Enlargement Display Function>

Next, a display example at a time when the image enlargement display function is executed will be described with reference to FIGS. 3A and 3B.

Figure 3A:
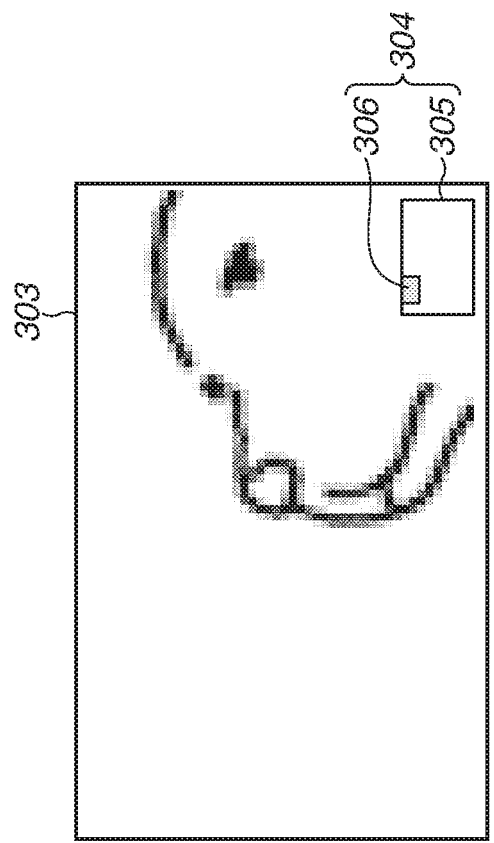
FIGS. 3A and 3B are diagrams illustrating an image enlargement display function.

FIG. 3A is a diagram illustrating an example of a display screen 300 that is displayed on the display unit 109 before execution of the image enlargement display function. The display screen 300 displays the entire picked-up image. FIG. 3A illustrates an enlargement range 301 and information 302 about image capturing. The enlargement range 301 is a range that the user intends to enlarge. The information 302 about image capturing is, for example, an image-capturing size, an International Standards Organization (ISO) sensitivity, an image capturing time, and a remaining battery level, and includes information the user desires to grasp when performing image capturing. The information 302 about image capturing is OSD data, and is displayed in a peripheral portion within the display screen 300. The information 302 about image capturing can be switched between display and hiding, based on selection by the user. Here, assume that the system control unit 50 displays the information 302 about image capturing in accordance with display settings selected by the user. The user can enlarge the enlargement range 301 (a portion of the image) by operating, for example, the enlargement key included in the operation unit 120, and can display an enlarged image resulting from this enlargement.

Figure 3B:
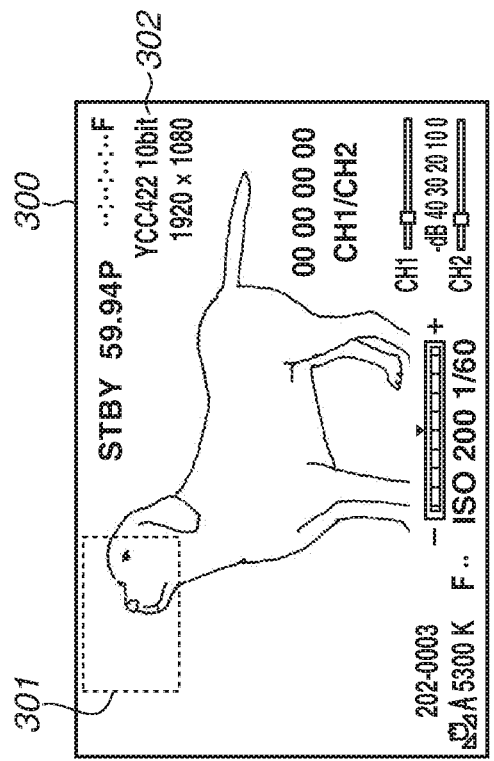

FIG. 3B is a diagram illustrating an example of a display screen 303 following execution of the image enlargement display function. A radar chart 304 is displayed in a portion (e.g., in a lower right portion) inside the display screen 303. The radar chart 304 indicates the enlarged position with respect to the entire image, i.e., the position of the enlargement range 301. The radar chart 304 is OSD data, and corresponds to an example of an enlargement guide.

The radar chart 304 includes an entire image display 305 for displaying the range corresponding to the entire image, and an enlargement range display 306 for displaying the position of the enlargement range with respect to the entire image. Therefore, the user can grasp the position of the enlargement range with respect to the entire image, by visually recognizing the radar chart 304, in a case where the user executes the image enlargement display function.

In a case where an enlarged portion of the picked-up image is displayed as an enlarged image as illustrated in FIG. 3B, the system control unit 50 hides the information 302 about image capturing, even when displaying the information 302 about image capturing is selected. By hiding the information 302 about image capturing, the visibility of the enlarged image can be enhanced.

Further, the user can change the enlargement range 301 to a desired position while maintaining a magnification, by operating the touch panel 121 or the direction key 122 included in the operation unit 120.

Specifically, the system control unit 50 receives an input signal from the operation unit 120 and determines a position of the enlargement range 301 based on the content of the input signal. The system control unit 50 subsequently enlarges the portion of the image based on the determined position of the enlargement range 301 and displays the enlarged portion in the display screen 303. Further, the system control unit 50 updates the position of the enlargement range display 306 within the radar chart 304 based on the determined position of the enlargement range 301, and displays the updated position.

The user can also change the magnification for enlarging the image, by operating the enlargement key included in the operation unit 120. The magnification is changed, for example, in order of 5 times (a first magnification), 10 times (a second magnification), and equal magnification (a third magnification), each time the enlargement key is pressed, and the result of the change is displayed. The user can enlarge the image to the magnification of 5 times, by operating the enlargement key from the state of the equal magnification.

Specifically, the system control unit 50 receives an input signal from the operation unit 120, and determines a magnification for enlargement of the image, based on the content (or the number of times) of the input signal. The system control unit 50 subsequently enlarges the portion of the image based on the determined magnification, and displays the enlarged portion in the display screen 303. Further, the system control unit 50 updates the size of the enlargement range display 306 within the radar chart 304 based on the determined size (magnification) of the enlargement range 301, and displays the enlargement range 301 of the updated size. The system control unit 50 also changes the position of the enlargement range 301 as necessary.

<Display Example in Execution of Image Enlargement Display Function and Focus Guide Function>

Next, a display example at a time when the image enlargement display function is executed after the focus guide function is enabled will be described with reference to FIGS. 4A and 4B.

Figure 4B:
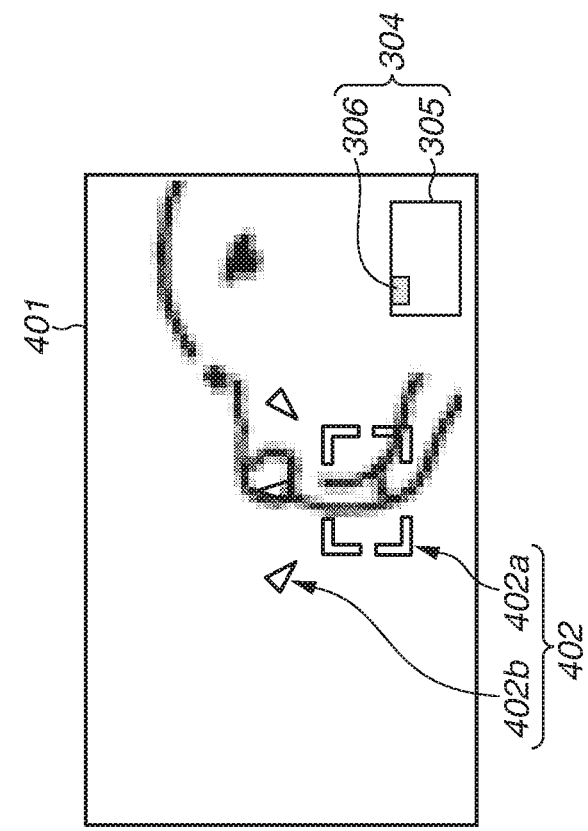
FIGS. 4A and 4B are diagrams illustrating the focus guide function and the image enlargement display function.
Figure 4A:
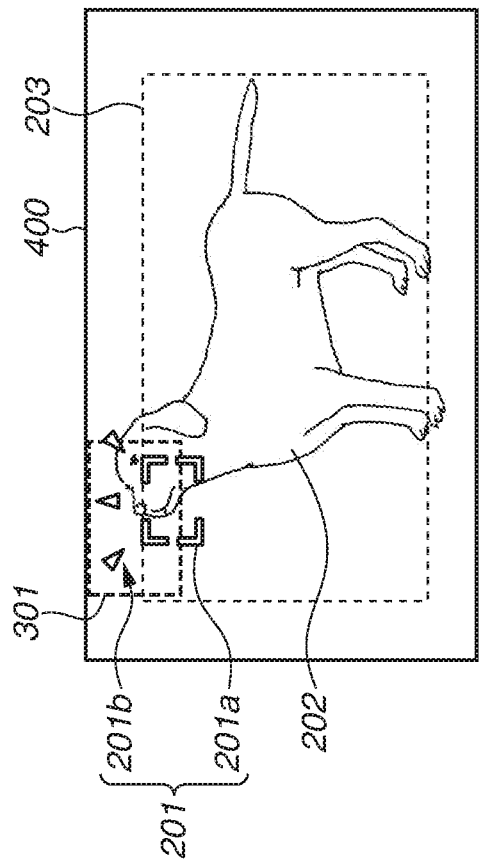

FIG. 4A is a diagram illustrating an example of a display screen 400 displayed on the display unit 109 before execution of the image enlargement display function. The display screen 400 displays the entire picked-up image. In FIG. 4A, the same configurations as the configurations in FIG. 2A and FIG. 3A are provided with the same reference numerals as the reference numerals in FIG. 2A and FIG. 3A. Here, assume that hiding the information about image capturing is selected.

In FIG. 4A, the focus guide 201 is displayed at the position of a portion with respect to the picked-up image. Further, the focus guide 201 has reached the movable edge of the focus guide movable range 203. In other words, an upper part of the focus guide 201 touches the boundary of the focus guide movable range 203, and is in a state where the upper part is in contact with the boundary of the focus guide movable range 203 (an adjacent state). Therefore, the system control unit 50 controls the focus guide 201 not to move, even when the user performs an operation for moving the focus guide 201 upward. Here, the entire picked-up image is displayed. Therefore, even when the focus guide movable range 203 is not displayed, the user can guess that the focus guide 201 cannot be moved despite the user operation to move the focus guide upward because the focus guide 201 has reached the movable edge of the focus guide movable range 203.

Next, assume that the user has performed an enlargement operation for the enlargement range 301 including the position of the focus guide 201.

FIG. 4B is a diagram illustrating an example of a display screen 401 that follows enlargement of the enlargement range 301 illustrated in FIG. 4A by execution of the image enlargement display function. In FIG. 4B, the same configurations as the configurations in FIG. 3B are provided with the same reference numerals as the reference numerals in FIG. 3B.

Here, the enlargement is performed for the enlargement range 301 including the position of the focus guide 201 illustrated in FIG. 4A. Therefore, in the enlarged image illustrated in FIG. 4B, a focus guide 402 is displayed at the same position as the position of the focus guide 201 with respect to the picked-up image illustrated in FIG. 4A. Because the position of the focus guide 402 with respect to the picked-up image has not changed since before the enlargement, the focus status at the position of the focus guide 402 is the same as the focus status at the position of the focus guide 201. Therefore, the display modes of the guide frame 201a and the pointer 201b of the focus guide 201 illustrated in FIG. 4A and the display modes of a guide frame 402a and a pointer 402b of the focus guide 402 in FIG. 4B are identical.

On the other hand, even in the state where the enlarged image is displayed, the user can perform an operation for bringing the focus guide 402 to a position at which the user desires to confirm the focus status, in order to perform a focus adjustment by himself or herself. However, in FIG. 4B, an upper part of the focus guide 402 is in contact with the boundary of the focus guide movable range (an adjacent state), as with the state described with reference to FIG. 4A. As a result, the user cannot move the focus guide 402 even when the user performs an operation for moving the focus guide 402 upward.

In a case where the enlarged image is displayed, an upper space is wider than in a case where the entire picked-up image is displayed. Therefore, it is difficult for the user to grasp the focus guide 402 having reached the movable edge, and thus it is difficult to understand the reason why an upward movement cannot be made.

Therefore, in the present exemplary embodiment, display control is performed so that the user can grasp the range in which the focus guide 402 is movable in a case where the picked-up image is enlarged. The system control unit 50 performs control processing so that the focus guide movable range that is the range in which the focus guide 402 is movable is displayed in a case where the picked-up image is enlarged. This processing will be described below.

Figure 5:
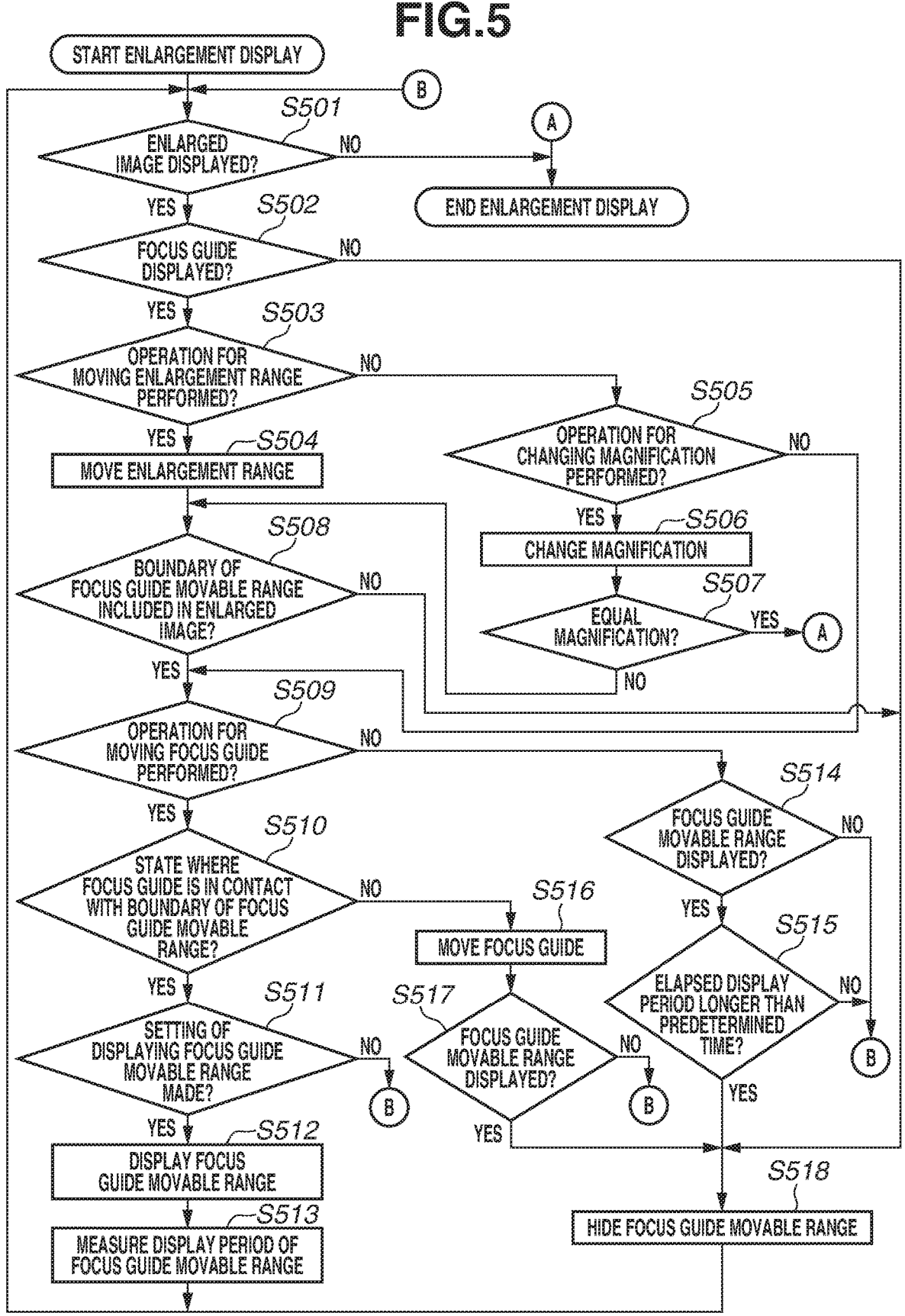
FIG. 5 is a flowchart illustrating an example of display control processing by the digital camera.

FIG. 5 is a flowchart illustrating an example of processing for display control in enlargement display by the camera 100. The system control unit 50 implements the flowchart in FIG. 5, by reading out the program stored in the nonvolatile memory 111, loading the read-out program into the system memory 112, and executing the loaded program.

In step S501, the system control unit 50 determines whether an enlarged image of a picked-up image is displayed on a display screen of the display unit 109. The system control unit 50 can determine whether the enlarged image is displayed, based on magnification information stored in the system memory 112. If the enlarged image is displayed (YES in step S501), the processing proceeds to step S502. If the enlarged image is not displayed (NO in step S501), the processing of the flowchart in FIG. 5 ends.

In step S502, the system control unit 50 determines whether the focus guide superimposed on the enlarged image is displayed. In a case where the focus guide is located outside the enlarged image or in a case where enabling the focus guide function is not set, the focus guide is not displayed even when the enlarged image is displayed. If the focus guide is displayed (YES in step S502), the processing proceeds to step S503. If the focus guide is not displayed (NO in step S502), the processing proceeds to step S518.

The system memory 112 stores information indicating the current position of the focus guide with respect to the picked-up image.

In step S503, the system control unit 50 determines whether an operation for moving the enlargement range is performed by the user. If the operation for moving the enlargement range is performed (YES in step S503), the processing proceeds to step S504. If the operation for moving the enlargement range is not performed (NO in step S503), the processing proceeds to step S505.

In step S504, based on the operation for moving the enlargement range, the system control unit 50 changes the position of the enlargement range while maintaining the magnification, and displays the enlargement range at the changed position. In other words, the system control unit 50 moves the enlargement range.

On the other hand, in step S505, the system control unit 50 determines whether an operation for changing the magnification is performed by the user. If the operation for changing the magnification is performed (YES in step S505), the processing proceeds to step S506. If the operation for changing the magnification is not performed (NO in step S505), the processing proceeds to step S509.

In step S506, the system control unit 50 changes the magnification of the image and displays the image at the changed magnification. Specifically, if the current magnification is 5 times (the first magnification), the system control unit 50 changes the current magnification to 10 times (the second magnification). If the current magnification is 10 times (the second magnification), the system control unit 50 changes the current magnification to the equal magnification (the third magnification). The system control unit 50 then displays the image at the changed magnification. The system control unit 50 updates the magnification information stored in the system memory 112.

Even when the focus guide movable range is displayed in the enlarged image as will be described below, the system control unit 50 hides the focus guide movable range in a case where the image is displayed at the equal magnification. Further, even when the information about image capturing is hidden in the enlarged image, the system control unit 50 displays the information about image capturing in a peripheral portion within the screen, in a case where the image is displayed at the equal magnification and displaying the information about image capturing is selected.

In this way, the focus guide movable range in a case where the image is displayed at the equal magnification is hidden so that the visibility of the image can be enhanced. In addition, it is possible to avoid interfering with the visibility of the information about image capturing displayed in the peripheral portion within the screen. Moreover, it is possible to prevent the user from confusing the display with the display of other frame (such as a face frame, an aspect marker, a safety zone, or a grid line). The face frame is a display item that displays a frame around a detected face of a person included in the picked-up image. The aspect marker is a display item that displays a predetermined aspect ratio, for example, in a frame shape. The safety zone is a display item that displays an area that is assumed to be displayable regardless of the type of the display unit when the picked-up image is displayed, for example, in a frame shape. The grid line is a display item that displays a reference line to be used when composition is determined, in a grid shape. In a case where the image is displayed at the equal magnification, the system control unit 50 displays any of the above-described other frames based on setting performed by the user in, for example, the menu. In a case where the enlarged image is displayed, the system control unit 50 hides the above-described other frames to enhance the visibility of the focus guide movable range.

In step S507, the system control unit 50 determines whether the current magnification is the equal magnification. The system control unit 50 can determine the current magnification based on the magnification information stored in the system memory 112. If the current magnification is not the equal magnification (NO in step S507), the processing proceeds to step S508. On the other hand, if the current magnification is the equal magnification (YES in step S507), the processing of the flowchart in FIG. 5 ends.

In step S508, the system control unit 50 determines whether the boundary of the focus guide movable range, i.e., the movable edge of the focus guide movable range is included in the enlarged image (within the enlargement range) displayed on the display unit 109. Specifically, the system control unit 50 can perform this determination based on information indicating the enlargement range, and information indicating the position of the focus guide movable range stored in the nonvolatile memory 111. If the boundary of the focus guide movable range is included (YES in step S508), the processing proceeds to step S509. If the boundary of the focus guide movable range is not included (NO in step S508), the processing proceeds to step S518.

In step S509, the system control unit 50 determines whether an operation for moving the focus guide is performed by the user. If the operation for moving the focus guide is performed (YES in step S509), the processing proceeds to step S510. If the operation for moving the focus guide is not performed (NO in step S509), the processing proceeds to step S514. In step S510, the system control unit 50 determines whether the focus guide is in a state where the focus guide is in contact with the boundary of the focus guide movable range (or the adjacent state). Specifically, the system control unit 50 determines whether the focus guide has reached the movable edge of the focus guide movable range, in a direction in which the focus guide is to be moved. The system control unit 50 can perform this determination based on information indicating the position of the focus guide stored in the system memory 112 and the information indicating the position of the focus guide movable range stored in the nonvolatile memory 111. In a case where the focus guide has reached the movable edge of the focus guide movable range in the direction in which the focus guide is to be moved, the focus guide cannot be moved in the designated direction. If the focus guide is in the state where the focus guide is in contact with the boundary of the focus guide movable range (YES in step S510), the processing proceeds to step S511. If the focus guide is in a state where the focus guide is not in contact with the boundary of the focus guide movable range (NO in step S510), the processing proceeds to step S516.

In step S511, the system control unit 50 determines whether setting of displaying the focus guide movable range is made. The user can select beforehand whether to display or hide the focus guide movable range by performing setting in, for example, the menu. The system control unit 50 stores the information selected by the user into the nonvolatile memory 111. If the setting of displaying the focus guide movable range is made (YES in step S511), the processing proceeds to step S512. If the setting of displaying the focus guide movable range is not made (NO in step S511), the processing returns to step S501.

In step S512, the system control unit 50 performs control to display the focus guide movable range in the enlarged image. Further, the system control unit 50 performs control not to move the focus guide, by cancelling the operation for moving the focus guide performed by the user.

Next, a display example of displaying the focus guide movable range in the enlarged image will be described. FIG. 6A is a diagram illustrating an example of a display screen 600 that displays the focus guide movable range. In FIG. 6A, the same configurations as the configurations in FIG. 4B are provided with the same reference numerals as the reference numerals in FIG. 4B. In other words, the focus guide 402 including the guide frame 402a and the pointer 402b superimposed on the enlarged image is displayed. Here, a boundary line superimposed on the enlarged image is displayed to indicate the boundary of a focus guide movable range 601. Here, the boundary line is OSD data, and corresponds to an example of an indicator that indicates a predetermined range.

The system control unit 50 can display the boundary line of the focus guide movable range 601, based on the information indicating the position of the focus guide movable range stored in the nonvolatile memory 111. The user recognizes that the focus guide movable range 601 is present in a direction in which the user desires to move the focus guide 402, by viewing the boundary line of the focus guide movable range 601 thus displayed in the enlarged image. Therefore, the user can guess that the focus guide 402 cannot be moved despite the user operation to move the focus guide 402 because the focus guide 402 has reached the movable edge of the focus guide movable range 601.

FIG. 6B is a diagram illustrating an example of a display screen 602 that displays the focus guide movable range in other form. In FIG. 6B, the same configurations as the configurations in FIG. 4B are provided with the same reference numerals as the reference numerals in FIG. 4B. In other words, the focus guide 402 including the guide frame 402a and the pointer 402b superimposed on the enlarged image is displayed, and the radar chart 304 including the entire image display 305 and the enlargement range display 306 is displayed. Here, a focus guide movable range 603 superimposed on the radar chart 304 is displayed in a frame. Here, the frame is OSD data, and corresponds to an example of the indicator that indicates the predetermined range.

The system control unit 50 displays the focus guide movable range 603 in the radar chart 304, based on the information indicating the position of the focus guide movable range stored in the nonvolatile memory 111. At this moment, the position of the focus guide movable range 603 to be displayed relative to the entire image display 305 and the ratio of the size to the entire image display 305 are substantially equal to the position of the focus guide movable range relative to the entire image and the ratio of the size to the entire image when the entire image is displayed on the display screen 602, respectively. The user recognizes that the boundary line of the focus guide movable range 603 is included in the enlargement range display 306, by viewing the focus guide movable range 603 thus displayed in the radar chart 304. Therefore, the user can guess that the focus guide 402 cannot be moved despite the user operation to move the focus guide 402 because the focus guide 402 has reached the movable edge of the focus guide movable range 603.

There is described the case where the focus guide movable range 601 is indicated by the boundary line in FIG. 6A and the focus guide movable range 603 is indicated by the frame shape in FIG. 6B. However, the present exemplary embodiment is not limited to this case. In other words, the focus guide movable range may only be displayed so that the user can identify the focus guide movable range, and thus, the focus guide movable range may be displayed in other form. For example, the focus guide movable range may be displayed using color. Specifically, the inside of each of the focus guide movable ranges 601 and 603 may be colored, or the outside of each of the focus guide movable ranges 601 and 603 may be colored. In a case where the inside or outside of the focus guide movable range 601 is colored, it is desirable that the color be transparent so that the enlarged image can be visually recognized, and the color be different from the color of the focus guide.

Referring back to FIG. 5, in step S513, the system control unit 50 starts measuring the display period of the focus guide movable range. Afterward, the processing returns to step S501.

In a case where the processing proceeds from step S509 to step S514, the system control unit 50 determines whether the focus guide movable range is displayed, in step S514. If the focus guide movable range is displayed (YES in step S514), the processing proceeds to step S515. If the focus guide movable range is not displayed (NO in step S514), the processing returns to step S501. In step S515, the system control unit 50 determines whether the display period of the focus guide movable has elapsed to be longer than a predetermined time. For example, information indicating the predetermined time is stored in the nonvolatile memory 111 beforehand. If the display period has elapsed to be longer than the predetermined time (YES in step S515), the processing proceeds to step S518. If the display period has not elapsed to be longer than the predetermined time (NO in step S515), the processing returns to step S501.

In a case where the processing proceeds from step S510 to step S516, the system control unit 50 changes the position of the focus guide based on the operation for moving the focus guide and displays the focus guide at the changed position. In other words, the system control unit 50 moves the focus guide. This processing corresponds to an example of processing by a moving unit.

In step S517, the system control unit 50 determines whether the focus guide movable range is displayed. If the focus guide movable range is displayed (YES in step S517), the processing proceeds to step S518. If the focus guide movable range is not displayed (NO in step S517), the processing returns to step S501.

In step S518, the system control unit 50 performs control for hiding the displayed focus guide movable range. Here, a case where the processing proceeds to step S518 from each of the previous steps will be described.

First, a case where the processing proceeds to step S518 because the focus guide is not displayed in step S502 will be described. In a case where the focus guide is not displayed, the focus guide movable range is hidden, because the user does not perform an operation for moving the focus guide in the first place. Therefore, it is not necessary to display the focus guide movable range and thus the focus guide movable range is hidden.

Next, a case where the processing proceeds to step S518 because the boundary of the focus guide movable range is not included in the enlarged image in step S508 will be described. In this case, there is no occurrence of such a phenomenon that the focus guide cannot be moved even when the user performs an operation for moving the focus guide, because the focus guide is away from the movable edge. Therefore, it is not necessary to display the focus guide movable range and thus the focus guide movable range is hidden.

Next, a case where the processing proceeds to step S518 because the display period has elapsed to be longer than the predetermined time in step S515 will be described. Since the focus guide movable range is displayed for the predetermined time, it can be determined that the user is fully aware of the presence of the focus guide movable range. Therefore, the focus guide movable range is hidden.

Next, a case where the processing proceeds to step S518 because the focus guide movable range is displayed in step S517 will be described. Here, since the focus guide can be moved based on the operation for moving the focus guide in step S516, there is no occurrence of such a phenomenon that the focus guide cannot be moved. Therefore, it is not necessary to display the focus guide movable range and thus the focus guide movable range is hidden.

In this way, in a case where it is not necessary to display the focus guide movable range or in a case where the purpose of displaying the focus guide movable range is fulfilled, the focus guide movable range is hidden, so that the visibility of the enlarged image can be enhanced.

The present exemplary embodiment has been described above using the case where each of the focus guide movable ranges 601 and 603 is displayed when the enlarged image is displayed and when the specific state determined in each of step S508 to step S511 is satisfied. However, each of the focus guide movable ranges 601 and 603 may be displayed when the enlarged image is displayed and when the specific state determined in any one of step S508 to step S511 is satisfied.

Further, modifications of the case where the boundary line of the focus guide movable range 601 is displayed in the enlarged image as illustrated in FIG. 6A will be specifically described. The following modifications can be combined as appropriate.

Even when the enlarged image is displayed, the boundary line of the focus guide movable range 601 may be hidden in a case where the boundary of the focus guide movable range 601 is not included in the enlarged image (the display screen 600), and may be displayed in a case where the boundary of the focus guide movable range 601 is included in the enlarged image.

Even when the enlarged image is displayed, the boundary line of the focus guide movable range 601 may be hidden in a case where the focus guide 402 is not in contact with (is away from) the boundary of the focus guide movable range 601, and may be displayed in a case where the focus guide 402 is in contact with the boundary of the focus guide movable range 601.

Even when the enlarged image is displayed, the boundary line of the focus guide movable range 601 may be hidden in a case where the focus guide 402 is not moved (or before an instruction for the movement is provided), and may be displayed in a case where the focus guide 402 is moved.

The boundary line of the focus guide movable range 601 may be hidden after a predetermined time has elapsed since the completion of the movement of the focus guide 402, and may be displayed within the predetermined time.

The boundary line of the focus guide movable range 601 may be hidden at a normal magnification (the equal magnification), and may be displayed in a case where the enlarged image is displayed.

Whether to display the boundary line of the focus guide movable range 601 when the enlarged image is displayed may be selectable by setting, for example, in the menu, and the boundary line of the focus guide movable range 601 may be displayed based on the selection.

Next, modifications of the case where the focus guide movable range 603 is displayed in the radar chart 304 as illustrated in FIG. 6B will be specifically described. The following modifications can be combined as appropriate.

Even when the enlarged image is displayed, the focus guide movable range 603 may be hidden in a case where the actual focus guide movable range is not included in the enlarged image (the display screen 602), and may be displayed in a case where the actual focus guide movable range is included in the enlarged image.

Even when the enlarged image is displayed, the focus guide movable range 603 may be hidden in a case where the focus guide 402 is not in contact with (is away from) the boundary of the actual focus guide movable range, and may be displayed in a case where the focus guide 402 is in contact with the boundary of the actual focus guide movable range.

Even when the enlarged image is displayed, the focus guide movable range 603 may be hidden in a case where the focus guide 402 is not moved (or before an instruction for the movement is provided), and may be displayed in a case where the focus guide 402 is moved.

The focus guide movable range 603 may be hidden after a predetermined time has elapsed since the completion of the movement of the focus guide 402, and may be displayed within the predetermined time.

Whether to display the focus guide movable range 603 when the enlarged image is displayed may be selectable by setting, for example, in the menu, and the focus guide movable range 603 may be displayed based on the selection.

As described above, according to the present exemplary embodiment, the control is performed so that the focus guide and the focus guide movable range are displayed together with the enlarged image in the specific state including the state where the enlarged image is displayed. In this way, the user can grasp the range in which the user can move the focus guide, by visually recognizing the focus guide movable range when the enlarged image is displayed.

The present exemplary embodiment has been described using the case where the focus detection position is the focus guide, but the present exemplary embodiment is not limited to this case. The focus detection position may be an AF frame that indicates a position for performing AF.

Further, according to the present exemplary embodiment, the display focus guide movable range is controlled to be hidden in a case where an enlarged portion of the image is not displayed, i.e., in a case where the entire image is displayed. As a result, the visibility of the displayed image can be enhanced. Even when the focus guide movable range is hidden in the case where the entire image is displayed, the user can visually recognize the focus guide being located in the peripheral portion within the screen, and thus, the user can easily guess the reason why the focus guide cannot be moved.

The present exemplary embodiment has been described using the case where the display focus guide movable range is not displayed if the entire image is displayed, but the present exemplary embodiment is not limited to this case. The focus guide movable range may be displayed even when the entire image is displayed.

The disclosure has been described above based on the suitable exemplary embodiment, but the disclosure is not limited to the above-described exemplary embodiment, and also includes various modes without departing from the scope of the disclosure. The above-described exemplary embodiment is only an embodiment of the disclosure and can be modified as appropriate.

One piece of hardware may perform the various kinds of control described above to be performed by the system control unit 50. Alternatively, a plurality of pieces of hardware (e.g., a plurality of processors and circuits) may control the entire apparatus by sharing the processing.

The present exemplary embodiment has been described using the case where the disclosure is applied to the camera 100 serving as an image pickup apparatus, but the disclosure is not limited to this case. The aspect of the embodiments is applicable to a display control apparatus, if the display control apparatus can be controlled to enlarge a portion of an image and display the enlarged portion. In other words, the aspect of the embodiments is applicable to apparatuses such as a personal computer (PC), a personal digital assistant (PDA), a mobile phone terminal, a smartphone, a tablet terminal, a portable image viewer, a music player, a game console, and an electronic book reader.

Further, the aspect of the embodiments is not limited to the main body of the image pickup apparatus. The aspect of the embodiments is also applicable to a control apparatus that remotely controls the image pickup apparatus by performing wired or wireless communication with the image pickup apparatus (including a network camera). Examples of the control apparatus that remotely controls the image pickup apparatus include apparatuses such as a smartphone, a tablet terminal, and a desktop PC. Based on operations performed on the control apparatus side and processing performed on the control apparatus side, commands for performing various kinds of operation and setting are sent from the control apparatus side to the image pickup apparatus, so that the image pickup apparatus can be remotely controlled. Further, a live view image picked by the image pickup apparatus can be received via wired or wireless communication and the received live view image can be displayed on the control apparatus side.

According to the present exemplary embodiment, it is possible to grasp a range in which a focus detection position can be moved when an enlarged portion of an image is displayed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-050914, filed Mar. 19, 2018, which is hereby incorporated by reference herein in its entirety.

What is claimed is:

1. An apparatus comprising:
    a memory and at least one processor configured to perform operations of following units;
    a moving unit configured to move a focus detection position based on a user operation, within a predetermined range of an image;
    a display control unit configured to perform display control for for enlarging a portion of the image corresponding to an enlargement range and displaying the enlarged portion of the image; and
    a control unit configured to perform control for displaying a display item that indicates the focus detection position and an indicator that indicates the predetermined range, together with the enlarged portion of the image, in a specific state including a state where the enlarged portion of the image is displayed,
    wherein the specific state is a case where boundary of the predetermined range is included in the enlargement range, and
    wherein the control unit performs control for hiding the indicator, in a case where the boundary of the predetermined range is not included in the enlargement range.

2. The apparatus according to claim 1, wherein the control unit performs control for hiding the indicator, in a case where the enlarged portion of the image is not displayed.

3. The apparatus according to claim 1, wherein the control unit performs control for displaying at least one of a grid line, an aspect marker, and a safety zone, in a case where the enlarged portion of the image is not displayed.

4. The apparatus according to claim 3, wherein the control unit performs control for hiding the grid line, the aspect marker, and the safety zone, in a case where the enlarged portion of the image is displayed.

5. The apparatus according to claim 1, wherein the control unit performs control for displaying information about image capturing in a peripheral portion within a screen of a display unit, in a case where the enlarged portion of the image is not displayed.

6. The apparatus according to claim 5, wherein the control unit performs control for hiding the information about image capturing in the peripheral portion within the screen of the display unit, in a case where the enlarged portion of the image is displayed.

7. The apparatus according to claim 1,
    wherein the specific state is a case where the focus detection position is moved based on an instruction for moving the focus detection position provided by a user, and,
    wherein the control unit performs control for hiding the indicator, before the instruction for moving the focus detection position is provided by the user.

8. The apparatus according to claim 1,
wherein the specific state is a case where a time period following completion of a movement of the focus detection position by the moving unit is within a predetermined time, and,
wherein the control unit performs control for hiding the indicator, in a case where the predetermined time elapses following the completion of the movement of the focus detection position by the moving unit.

9. The apparatus according to claim 1,
wherein the specific state is a case where the focus detection position reaches a movable edge, and,
wherein the control unit performs control for hiding the indicator, in a case where the focus detection position perform does not reach the movable edge.

10. The apparatus according to claim 1,
wherein the specific state is a case where displaying the indicator is set, and
wherein the control unit performs control for hiding the indicator, in a case where displaying the indicator is not set.

11. The apparatus according to claim 1, wherein the image is a live view picked up by an image pickup device.

12. The apparatus according to claim 1, wherein the display item is an item that indicates a degree of in-focus of the focus detection position or a degree of in-focus based on a defocus amount of the focus detection position.

13. The apparatus according to claim 1, wherein the display item is an autofocus (AF) frame that indicates a position for performing AF.

14. A method for an apparatus, the method comprising:
moving a focus detection position based on a user operation, within a predetermined range of an image;
performing display control for enlarging a portion of the image corresponding to an enlargement range and displaying the enlarged portion of the image; and
performing control for displaying a display item that indicates the focus detection position and an indicator that indicates the predetermined range, together with the enlarged portion of the image, in a specific state including a state where the enlarged portion of the image is displayed,
wherein the specific state is a case where boundary of the predetermined range is included in the enlargement range, and
wherein the performing control performs control for hiding the indicator, in a case where the boundary of the predetermined range is not included in the enlargement range.

15. The method according to claim 14, further comprising performing control for hiding the indicator, in a case where the enlarged portion of the image is not displayed.

16. The method according to claim 14, performing control for displaying at least one of a grid line, an aspect marker, and a safety zone, in a case where the enlarged portion of the image is not displayed.

17. A non-transitory computer readable storage medium that stores a program for causing a computer to perform a method comprising:
moving a focus detection position based on a user operation, within a predetermined range of an image;
performing display control for enlarging a portion of the image corresponding to an enlargement range and displaying the enlarged portion of the image; and
performing control for displaying a display item that indicates the focus detection position and an indicator that indicates the predetermined range, together with the enlarged portion of the image, in a specific state including a state where the enlarged portion of the image is displayed,
wherein the specific state is a case where boundary of the predetermined range is included in the enlargement range, and
wherein the performing control performs control for hiding the indicator, in a case where the boundary of the predetermined range is not included in the enlargement range.

18. The non-transitory computer readable storage medium according to claim 17, further comprising performing control for hiding the indicator, in a case where the enlarged portion of the image is not displayed.

19. The non-transitory computer readable storage medium according to claim 17, performing control for displaying at least one of a grid line, an aspect marker, and a safety zone, in a case where the enlarged portion of the image is not displayed.

* * * * *